US012450020B2

(12) United States Patent
Kinouchi

(10) Patent No.: US 12,450,020 B2
(45) Date of Patent: Oct. 21, 2025

(54) INFORMATION PROCESSING APPARATUS, INFORMATION PROCESSING SYSTEM, INFORMATION PROCESSING METHOD, AND STORAGE MEDIUM

(71) Applicant: CANON KABUSHIKI KAISHA, Tokyo (JP)

(72) Inventor: Rika Kinouchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 17/885,800

(22) Filed: Aug. 11, 2022

(65) Prior Publication Data

US 2023/0060868 A1  Mar. 2, 2023

(30) Foreign Application Priority Data

Aug. 25, 2021 (JP) .................. 2021-137501

(51) Int. Cl.
*G06F 3/14* (2006.01)
*G06F 3/0481* (2022.01)
*G06F 3/04842* (2022.01)

(52) U.S. Cl.
CPC .............. *G06F 3/14* (2013.01); *G06F 3/0481* (2013.01); *G06F 3/04842* (2013.01); *H04M 2215/8104* (2013.01); *H04M 2215/815* (2013.01)

(58) Field of Classification Search
CPC ...... G06F 3/14; G06F 3/0481; G06F 3/04842; H04N 1/00474; H04N 1/0035; H04M 2215/8104; H04M 2215/815
See application file for complete search history.

(56) References Cited

U.S. PATENT DOCUMENTS 9,992,356 B2 * 6/2018 Miyazawa ......... H04N 1/00212
2009/0059286 A1 * 3/2009 Yamaguchi ............. H04N 1/32
358/1.15

(Continued)

FOREIGN PATENT DOCUMENTS

JP  2016-191994 A  11/2016
JP  2017016393 A   1/2017
JP  2020019238 A   2/2020

OTHER PUBLICATIONS

Japanese Office Action dated Jun. 3, 2025 in counterpart Japanese Patent Appln. No. 2021-137501.

*Primary Examiner* — Patrick F Riegler
(74) *Attorney, Agent, or Firm* — Venable LLP

(57) ABSTRACT

An information processing apparatus according to the present disclosure includes a first obtaining unit that obtains mode information indicating a set display mode and a second obtaining unit that performs a notification information obtaining process of obtaining notification information provided by a server system. The information processing apparatus further includes a display unit that displays a screen depending on the display mode and a notification image based on the notification information, a save unit that saves the notification information obtained by the second obtaining unit, and a control unit that controls the display unit. The control unit allows the display unit to display the notification image if the notification information saved in the save unit corresponds to the set display mode, and cause the display unit not to display the notification image if the notification information does not correspond to the display mode indicated by the mode information.

38 Claims, 15 Drawing Sheets

(56) References Cited

U.S. PATENT DOCUMENTS

| | | | | |
|---|---|---|---|---|
| 2009/0254942 | A1* | 10/2009 | Matsuzaki | H04N 21/4882 |
| | | | | 725/43 |
| 2010/0058123 | A1* | 3/2010 | Yamashirodani | G06F 11/0733 |
| | | | | 714/48 |
| 2011/0058228 | A1* | 3/2011 | Inamoto | G06V 30/224 |
| | | | | 358/448 |
| 2015/0373211 | A1* | 12/2015 | Minamikawa | H04N 1/00474 |
| | | | | 358/1.15 |
| 2017/0006171 | A1* | 1/2017 | Kaneko | H04N 1/00042 |
| 2017/0013148 | A1* | 1/2017 | Hayakawa | H04N 1/00472 |
| 2017/0093865 | A1* | 3/2017 | Watanabe | G06F 3/1237 |
| 2018/0007229 | A1* | 1/2018 | Adachi | H04N 1/32122 |
| 2018/0246686 | A1* | 8/2018 | Funakawa | G06F 3/1288 |
| 2018/0309901 | A1* | 10/2018 | Yokoyama | H04N 1/32662 |
| 2019/0260884 | A1* | 8/2019 | Nakajima | H04N 1/00514 |
| 2020/0162627 | A1* | 5/2020 | Utoh | H04N 1/00209 |
| 2021/0006677 | A1* | 1/2021 | Ushinohama | H04N 1/00474 |
| 2022/0009241 | A1* | 1/2022 | Azechi | G03G 15/502 |
| 2022/0091727 | A1* | 3/2022 | Tokunaga | G06F 3/0485 |
| 2022/0094799 | A1* | 3/2022 | Chiba | H04N 1/00503 |
| 2022/0166888 | A1* | 5/2022 | Okuno | H04N 1/00501 |
| 2022/0294919 | A1* | 9/2022 | Seto | H04N 1/00514 |
| 2023/0010119 | A1* | 1/2023 | Hayashi | G06F 8/34 |
| 2023/0063244 | A1* | 3/2023 | Katayama | G06F 16/9566 |

* cited by examiner

```
{
 "url": https://server.com/support_info.html,
 "timing": "startup",
 ...
}
```

FIG.9A

```
{
 "url": https://server.com/sales_info.html,
 "timig": "jobend",
 ...
}
```

FIG.9B

```
{
 "url": https://server.com/contents_info.html,
 "timig": "info",
 ...
}
```

| DISPLAY TIMING | DESCRIPTION |
|---|---|
| POWER ON | STATE IN IDLING IN CASE WHERE START-UP PROCESS IS COMPLETED |
| COMPLETION OF PRINT JOB | STATE IN IDLING IN CASE WHERE PRINT PROCESS IS COMPLETED |
| PRESSING OF INFORMATION BUTTON | STATE AFTER PRESSING OF INFORMATION BUTTON |

INFORMATION PROCESSING APPARATUS, INFORMATION PROCESSING SYSTEM, INFORMATION PROCESSING METHOD, AND STORAGE MEDIUM

BACKGROUND OF THE INVENTION

Field of the Invention

The present disclosure relates to a technique of displaying information provided by a server in an information processing apparatus.

Description of the Related Art

Currently, contents such as advertisements and notification relating to new functions are delivered from a server connected to a network to information processing apparatuses such as smartphones and printers to provide various pieces of information to users. The provided information includes not only information useful to the users but also unnecessary information in some cases. For example, there is an information processing apparatus that has a standard mode in which many functions are displayed and a basic mode in which only the basic functions are displayed as graphic user interface (GUI) modes and that uses these modes by selectively switching between these modes. In this type of information processing apparatus, the information provided by the server sometimes includes information that cannot be used in the basic mode. The information that cannot be used in the basic mode is unnecessary information for a user using the information processing apparatus in the basic mode and the user may feel hassled and confused in some cases if the unnecessary information is displayed.

Japanese Patent Laid-Open No. 2016-191994 discloses a technique of switching display and non-display of notification information to be displayed in an information processing apparatus. In this technique, the information is provided from a server to the information processing apparatus and displayed only in the case where an account with administrator privileges logs into the server from the information processing apparatus.

SUMMARY OF THE INVENTION

In the technique disclosed in Japanese Patent Laid-Open No. 2016-191994, a manager switches the display and non-display of notification information in the information processing apparatus. Meanwhile, a technique that enables display of the notification information depending on a usage status of the GUI mode in the information processing apparatus is desired to be provided.

The present disclosure provides an information processing apparatus in which a plurality of different display modes are selectively settable, the information processing apparatus comprising: a first obtaining unit that obtains mode information indicating a display mode set by a user; a second obtaining unit that performs a notification information obtaining process of obtaining notification information provided by a server system through communication with the server system; a display unit that displays a screen depending on the display mode and a notification image based on the notification information; a save unit that saves the notification information obtained by the second obtaining unit; and a control unit that controls the display unit, wherein the control unit allows the display unit to display the notification image in the case where the notification information saved in the save unit corresponds to the display mode indicated by the mode information, and cause the display unit not to display the notification image in the case where the notification information does not correspond to the display mode indicated by the mode information.

The present disclosure enables display of the notification information depending on a usage status of the display mode in the information processing apparatus.

Further features of the present invention will become apparent from the following description of exemplary embodiments with reference to the attached drawings.

BRIEF DESCRIPTION OF THE DRAWINGS

FIGS. 9A to 9C are views illustrating examples of a response send to the MFP by the service management server;

FIG. 10 is a table explaining display timings of the notification image saved in a non-volatile memory.

FIG. 12 is a flowchart illustrating a process of displaying the notification image in power on;

DESCRIPTION OF THE EMBODIMENTS

Embodiments of the present disclosure are described below in detail with reference to the attached drawings. Note that the following embodiments do not limit the present disclosure according to the scope of claims and not all of combinations of features described in the present embodiments are necessarily required for solving means of the present disclosure.

First Embodiment

<System Configuration>

Figure 1:
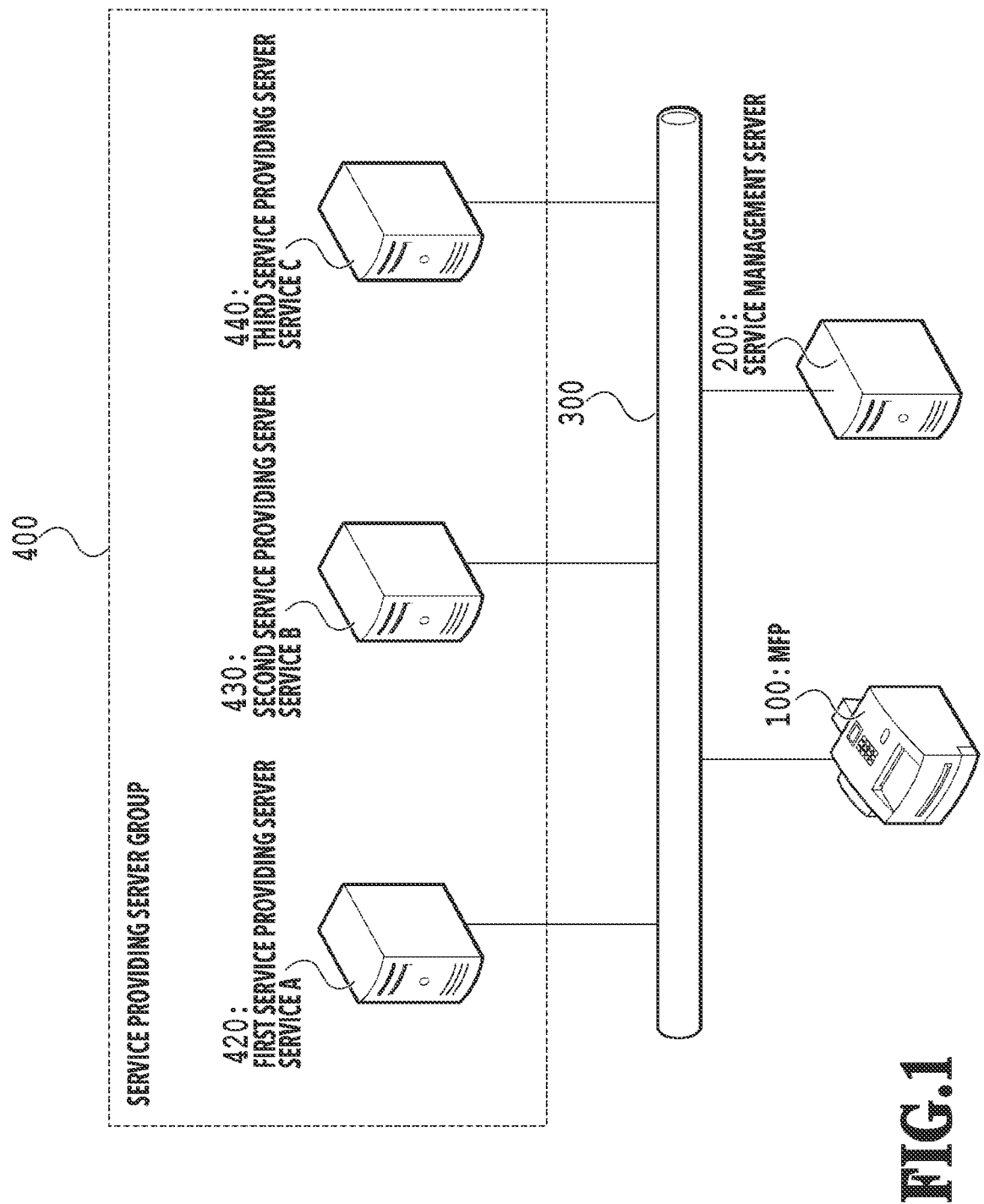
FIG. 1 is an overall configuration diagram of an information processing system.

FIG. 1 is an overall configuration diagram of an information processing system. The information processing system includes a multi function peripheral (MFP) 100 that is an information processing apparatus, a service management server 200, a service providing server group 400, and a communication network 300. The service providing server group 400 collectively refers to service providing servers that provide various services. In the example of FIG. 1, the service providing server group 400 includes a first service providing server 420 that provides a service A, a second service providing server 430 that provides a service B, and a third service providing server 440 that provides a service C.

<Outline of System>

An outline of processes performed in the information processing system of the present embodiment is described. First, examples of services provided by the present system are described. The examples of the services include a firmware upgrade service for the MFP 100 that is the information processing apparatus. This service is a service that provides a fixed firmware and updates the firmware of the MFP 100 in the case where modifications on the firmware of the MFP 100 or measures against failures are made. Examples of other services include a sales service of expendables such as ink of the MFP 100. A user of the MFP 100 can access the server that provides the service and order and buy the expendables. Other services include a service of providing print contents. The user of the MFP 100 can access the server that provides the service and download and print the print contents. Note that the aforementioned services are merely examples and the services are not limited to those described above. The provided services only need to be services relating to the MFP 100.

In the system according to the present embodiment, there is performed a process of displaying, on a screen of the MFP 100, a notification image based on notification information to be notified from the service providing server group 400 to the user of the MFP 100. In the example illustrated in FIG. 1, the MFP 100, the service management server 200, and the service providing server group 400 are coupled to one another to be capable of communicating with one another via the communication network 300. Note that, in the present embodiment, a mode in which the MFP 100 receives the services provided by the service providing server group 400 via the service management server 200 is employed. Specifically, although a mode in which the MFP 100 directly receives the notification information from the service providing servers 420, 430, and 440 is not employed, such a mode may also be employed.

Providing the service management server 200 as described above allows various pieces of the notification information from the service providing server group 400 to be aggregated in the service management server 200. The service management server 200 exchanges information with each of the service providing servers 420 to 440 that provide various services. The MFP 100 thus does not have to directly exchange information with the service providing servers and can efficiently obtain information.

The information exchange between the service management server 200 and the first to third service providing servers 420 to 440 is performed in the case where usage conditions of the respective services are satisfied. The usage conditions include, for example, a registration process that allows usage of the services between the user and each of the service providing servers 420 to 440. In the case where the usage conditions of the services are satisfied, each of the service providing servers 420 to 440 exchanges information with the service management server 200 and provides the notification information. In communication with each service providing server, communication control according to hypertext transfer protocol (HTTP), extensible messaging and presence protocol (XMPP), or the like is performed. Note that other protocols may be used as the protocol of communication control.

The service providing server group 400 and the service management server 200 described above form a server system in the present embodiment. Moreover, each of the service providing servers 420 to 440 and the service management server 200 may be formed of one or multiple server apparatuses.

<Configuration of MFP>

Figure 2:
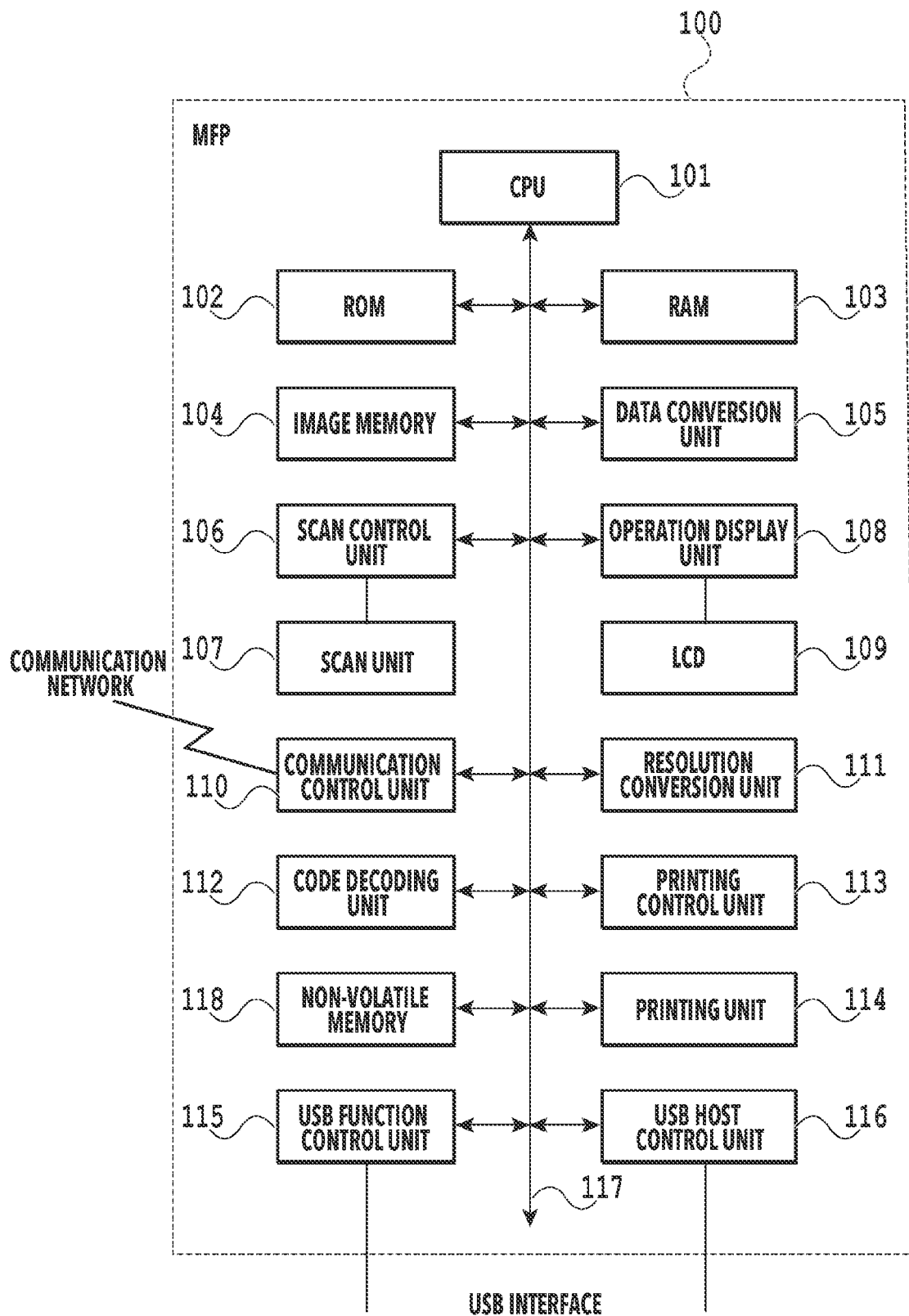
FIG. 2 is a block diagram illustrating a schematic configuration example of an MFP.

FIG. 2 is a block diagram illustrating a schematic configuration example of the MFP 100 in the present embodiment. The MFP 100 is an electronic device having information processing functions such as generation, storage, transmission, and display of device information including log information and status information. Moreover, a printing control unit 113 and a printing unit 114 to be described later provide an image forming function of forming an image on a print medium, to the MFP 100.

The MFP 100 includes a CPU 101, a ROM 102, a RAM 103, an image memory 104, a data conversion unit 105, a scan control unit 106, a scan unit 107, an operation display unit 108, an LCD 109, a communication control unit 110, and a resolution conversion unit 111. Moreover, the MFP 100 includes a code decoding unit 112, the printing control unit 113, a printing unit 114, a USB function control unit 115, a USB host control unit 116, a bus 117, and a non-volatile memory 118.

The CPU 101 has a function as a control unit that integrally controls the units of the MFP 100. The ROM 102 is a non-volatile memory that stores fixed data such as control programs, a data table, and an embedded operating system (OS) to be executed by the CPU 101. In the embodiment, for the control programs stored in the ROM 102, software execution control such as scheduling, task switching, and interruption processes is performed under management of the embedded OS stored in the ROM 102. Information indicating whether or not the MFP 100 is in a permitted state where the device information is provided to the outside is stored in the ROM 102. The RAM 103 is formed of a static random access memory (SRAM) that requires a backup power supply or the like and power supply to the RAM 103 is guaranteed by a not-illustrated primary battery for data backup. Program control variables and the like are stored in the RAM 103. The image memory 104 is formed of a dynamic random access memory (DRAM) or the like and can store image data. Moreover, some regions of the image memory 104 are secured as a work region for executing software processes. The data conversion unit 105 can analyze page description language (PDL) and perform conversion of image data such as computer graphics (CG) development of character data.

The scan unit 107 optically scans an original with a contact image sensor (CIS) and converts the original into an image signal. The scan control unit 106 performs various image processes such as a binarization process and a halftone process on the image signal and output high-definition image data. Note that either a sheet scanning control method in which the original is scanned with a fixed CIS or a book scanning control method in which an original fixed on an original plate is fixed with a moving CIS may be used as a method of optically scanning an original.

The operation display unit 108 is formed of minimum required keys such as numerical value input keys, a mode setting key, an enter key, and a cancel key and display units such as a light emitting diode (LED) and a seven-segment display unit. In the present embodiment, the various keys described above are implemented by so-called soft keys displayed on the LCD 109 and can receive operations from the user. In the case where a user operation is not performed for a certain period, the LCD 109 turns off a backlight of the LCD 109 to reduce power consumption.

The communication control unit 110 controls communication between the MFP 100 and the communication network 300 to couple to an Internet service provider and exchange various pieces of data with the service management server 200. The communication control unit 110 has a function as a second obtaining unit that performs a process of obtaining the notification information, notification image data, and the like to be described later in the present embodiment. Moreover, the communication control unit 110 can determine whether the MFP 100 is coupled to the Internet or only to a LAN. Note that the coupling between the communication control unit 110 and the communication network 300 is achieved by a publicly known method such as HTTP or XMPP.

The resolution conversion unit 111 performs resolution conversion processes such as interconversion between millimeter-based image data and inch-based image data. Note that the resolution conversion unit 111 can also execute a scaling process on the image data. The code decoding unit 112 performs a code decoding process and a scaling process on the image data handled in the MFP 100. The image data handled in the MFP 100 includes uncompressed image data as well as data compressed by MH method, MR method, MMR method, JBIG method, JPEG method, and the like. The printing control unit 113 performs various image processes such as a smoothing process, a printing density correction process, and a color correction process on the image data to be printed to convert the image data to the high-definition image data and outputs the high-definition image data to the printing unit 114. Moreover, the printing control unit 113 has a role of regularly obtaining status information data of the printing unit 114. The printing unit 114 is formed of a laser beam printer, an inkjet printer, or the like and prints the image data generated in the printing control unit 113 on a print medium such as a paper sheet.

The USB function control unit 115 performs protocol control according to USB communication standards. The USB host control unit 116 is a control unit for performing communication in a protocol defined by the USB communication standards. The USB communication standards are standards for bidirectional high-speed data communication and define that multiple hubs or functions (slaves) can be coupled to one host (master). Specifically, the USB host control unit 116 provides a function as a host in the USB communication. The configurations other than the scan unit 107 and the LCD 109 are coupled to one another via the bus 117.

The non-volatile memory 118 is formed of a device such as an electrically erasable programmable read-only memory (EEPROM) or a flash memory. The non-volatile memory 118 needs to hold data also in the case where no power is supplied. The non-volatile memory 118 is used as a save unit that saves data such as a flag of notification function, a flag of GUI mode (display mode), an image URL, and a display timing. Note that the flag of notification function refers to a flag indicating whether an information notification function is enabled or disabled, the information notification function being a function for notifying (displaying) the notification image sent from the service providing server group 400 via the service management server 200 by using the operation display unit 108 of the MFP 100. Moreover, the flag of GUI mode refers to a flag indicating a GUI mode currently set among GUI modes that can be set in the MFP 100. In the present embodiment, a standard mode and a simple mode are given as examples of the GUI modes that can be set in the MFP 100. Accordingly, the flag of GUI mode is a flag indicating which one of these modes is set in the MFP 100. The CPU 101 that functions as a first obtaining unit obtains information indicated by these flags. In the present embodiment, the simple mode is a mode in which display of a home screen is limited such that, among functions for which execution instructions can be given in the home screen displayed in the standard mode, only the execution instructions of basic functions that can be used in simple operations can be given. In other words, the number of functions for which execution instructions can be given in the home screen displayed in the simple mode is smaller than the number of functions for which execution instructions can be given in the home screen displayed in the standard mode.

Figure 3:
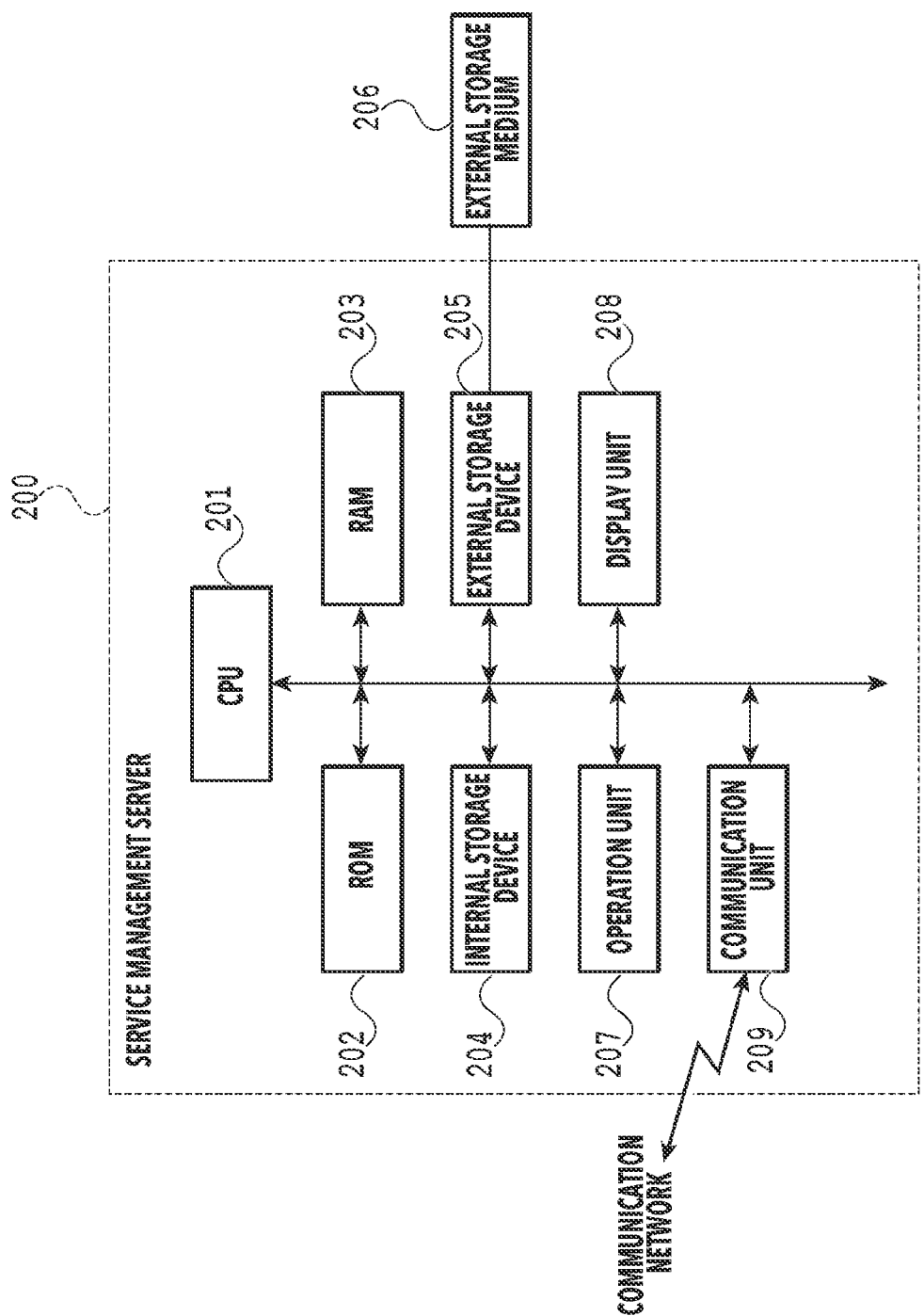
FIG. 3 is a block diagram illustrating a schematic configuration example of a service management server.

FIG. 3 is a block diagram illustrating a schematic configuration example of the service management server 200 in the present embodiment. The service management server 200 includes a CPU 201, a ROM 202, a RAM 203, an internal storage device 204, an external storage device 205, an operation unit 207, a display unit 208, and a communication unit 209.

The CPU 201 integrally controls operations of the entire service management server 200 according to a program read from the ROM 202, the RAM 203, the internal storage device 204 or read from an external storage medium 206 with the external storage device 205. Control programs of the CPU 201 and the like are stored in the ROM 202. Programs and various pieces of data are temporarily stored in the RAM 203 to allow processes of the service management server 200 to be operated at high speed. An operating system, various application programs, various pieces of data, and the like are stored in the internal storage device 204. Moreover, application software and the like for exchanging various control instructions and data are installed in the internal storage device 204. The operation unit 207 is, for example, input devices such as a keyboard and a mouse and receives instruction input from an operator of the service management server 200. The display unit 208 performs various types of display to the operator. The communication unit 209 is coupled to the communication network 300. The communication unit 209 performs coupling to the Internet service provider and communication of various pieces of data with the MFP 100 and the service providing servers 420 to 440 included in the service providing server group 400. Note that coupling to the communication network 300 is achieved by a publicly-known method such as HTTP and XMPP.

Figure 4:
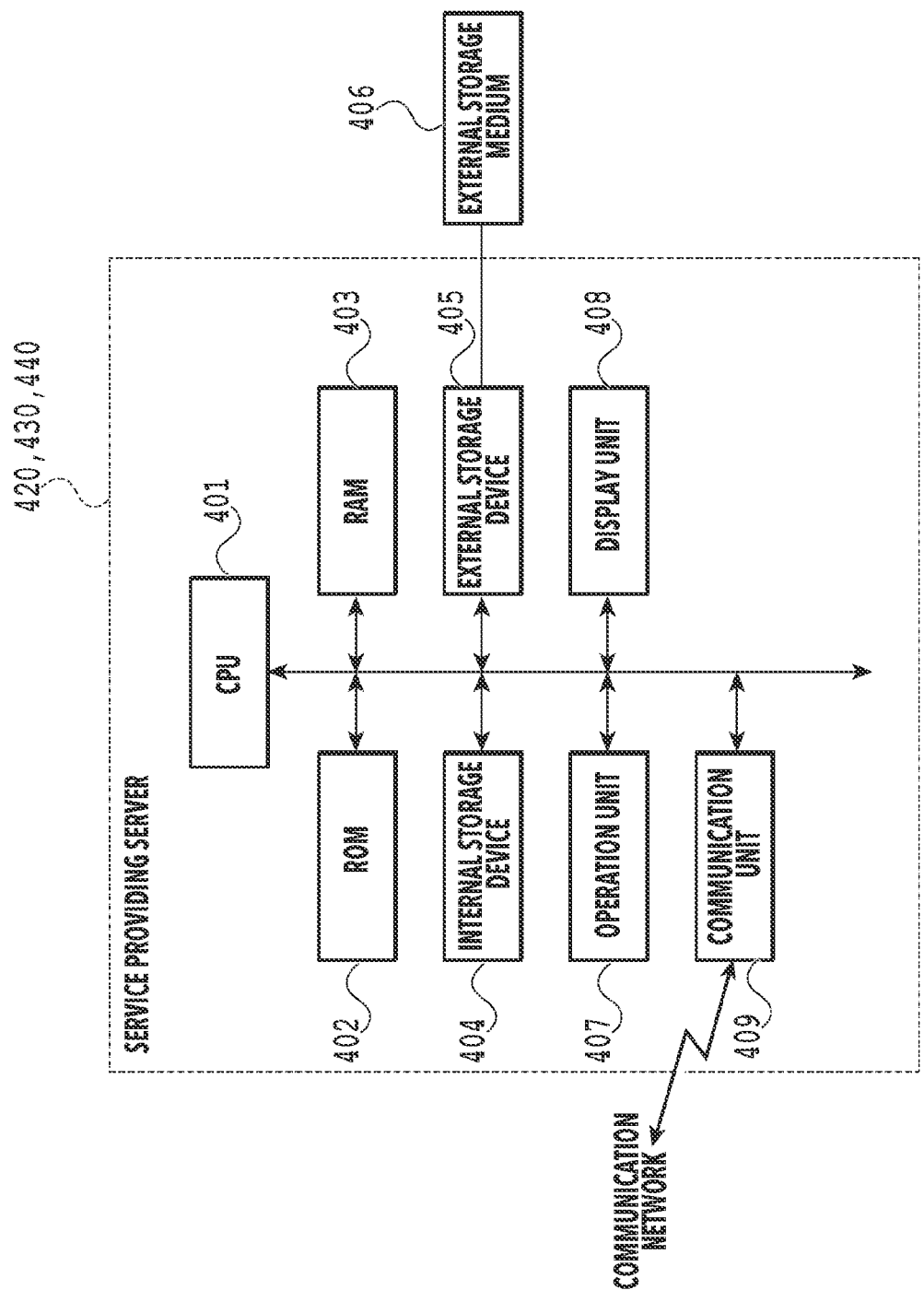
FIG. 4 is a block diagram illustrating a schematic configuration example of a service providing server.

FIG. 4 is a block diagram illustrating a schematic configuration example of each of the service providing servers included in and forming the service providing server group 400 in the present embodiment. Specifically, FIG. 4 illustrates a configuration example of the first service providing server 420, the second service providing server 430, and the third service providing server 400. Each service providing server includes a CPU 401, a ROM 402, a RAM 403, an internal storage device 404, an external storage device 405, an operation unit 407, a display unit 408, and a communication unit 409.

Since the service providing servers 420, 430, and 440 have the same configuration as the service management server 200 of FIG. 3 except for the configurations of the internal storage device 404 and the communication unit 409, description thereof is omitted herein. An operating system, various application programs, and various pieces of data are stored in the internal storage device 404. Moreover, application software and the like for exchanging various control instructions and data with the service management server 200 are installed in the internal storage device 404. The communication unit 409 is coupled to the communication network 300 and performs coupling to the Internet service provider and communication of various pieces of data with the service management server 200.

<Display Screen>

Figure 5A:
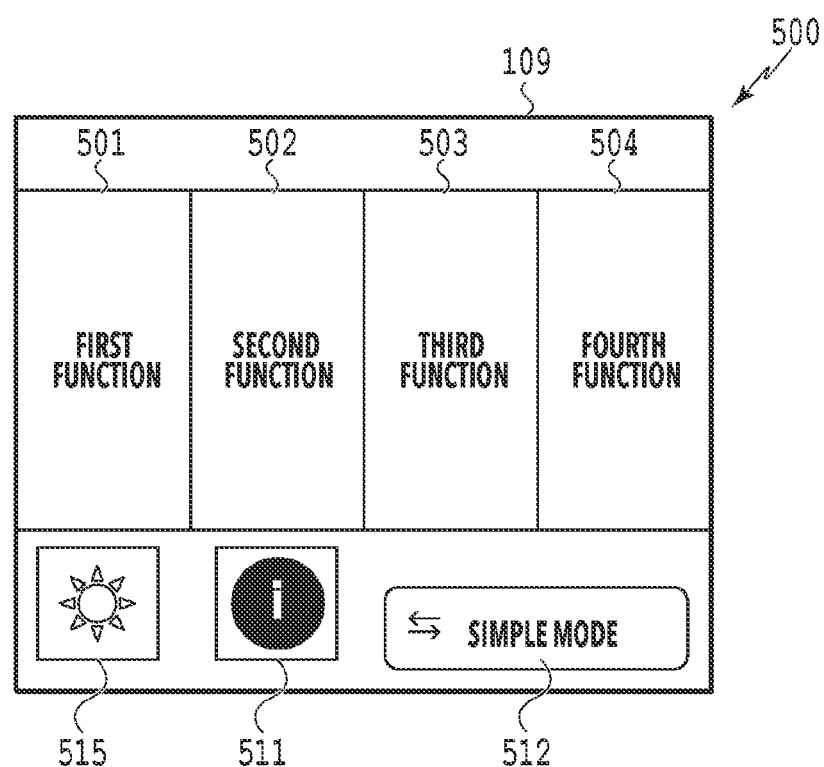
FIGS. 5A and 5B are views illustrating an example of a home screen for a standard mode.
Figure 5B:
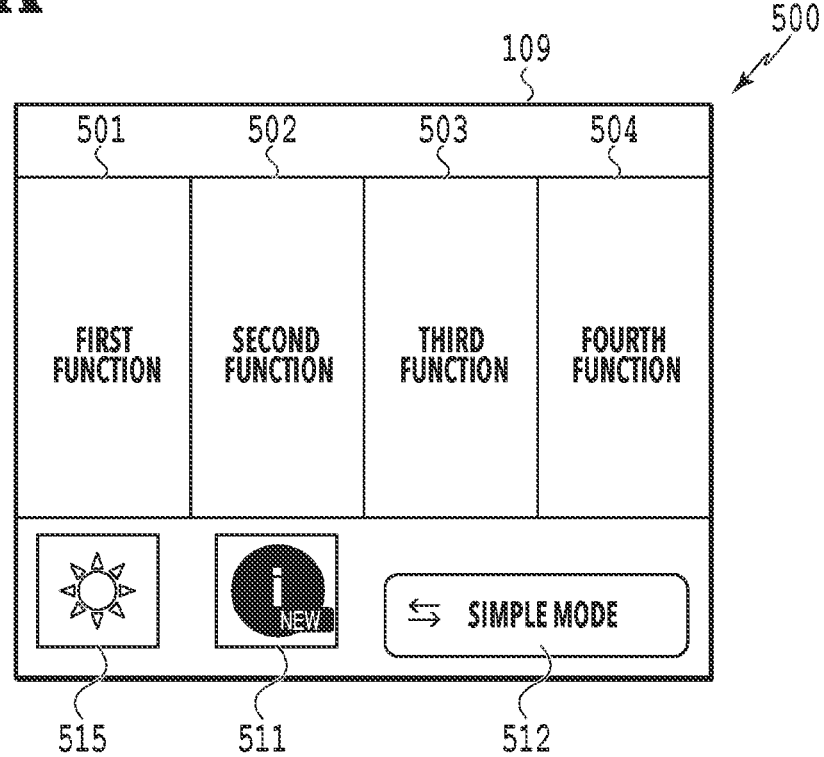
Figure 6:
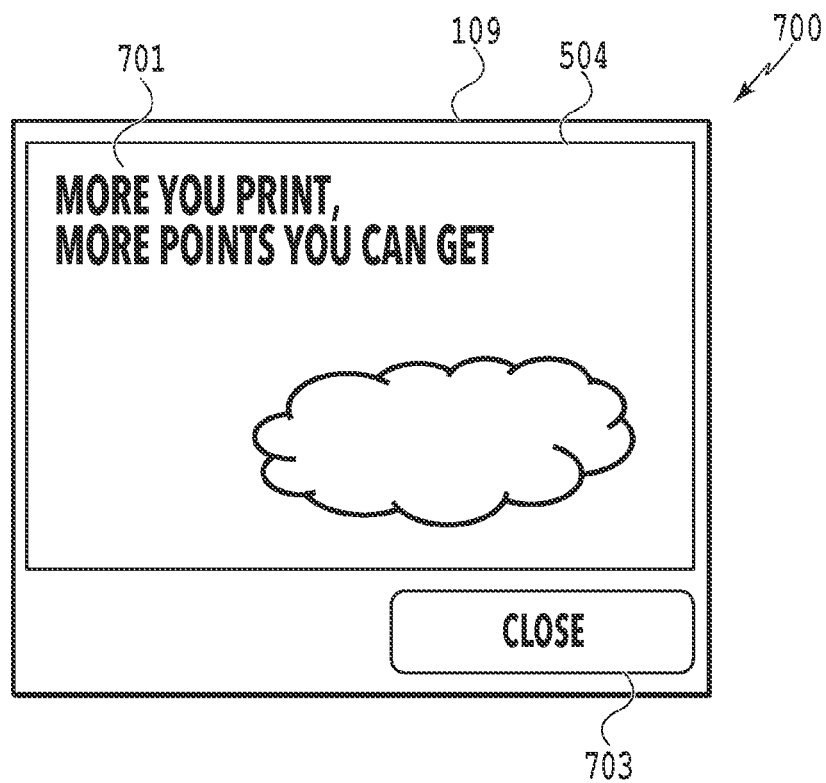
FIG. 6 is a view illustrating an example of a notification image based on notification information.

FIGS. 5A, 5B and 6 illustrate examples of screens displayed on the LCD 109 of the MFP 100. FIGS. 5A and 5B are views schematically illustrating a home screen 500 for the standard mode in which all functions of the MFP 100 are displayed. An information button 511, a GUI mode switching button 512, a setting button 515, and multiple buttons (first to fourth functions 501 to 504) for executing the respective multiple functions that can be executed in the MFP 100 are displayed as display elements in the home screen 500 for the standard mode illustrated as an example in FIGS. 5A and 5B. The GUI mode switching button 512 is a button for switching between multiple GUI modes displayed on the LCD 109. Note that the first to fourth functions 501 to 504 displayed as buttons for executing the functions are merely examples and the number and contents of the buttons for executing the functions are not limited to particular number and contents. Moreover, other buttons for executing the functions that can be executed in the MFP 100 may be newly displayed by, for example, scrolling of the home screen 500.

Figure 7:
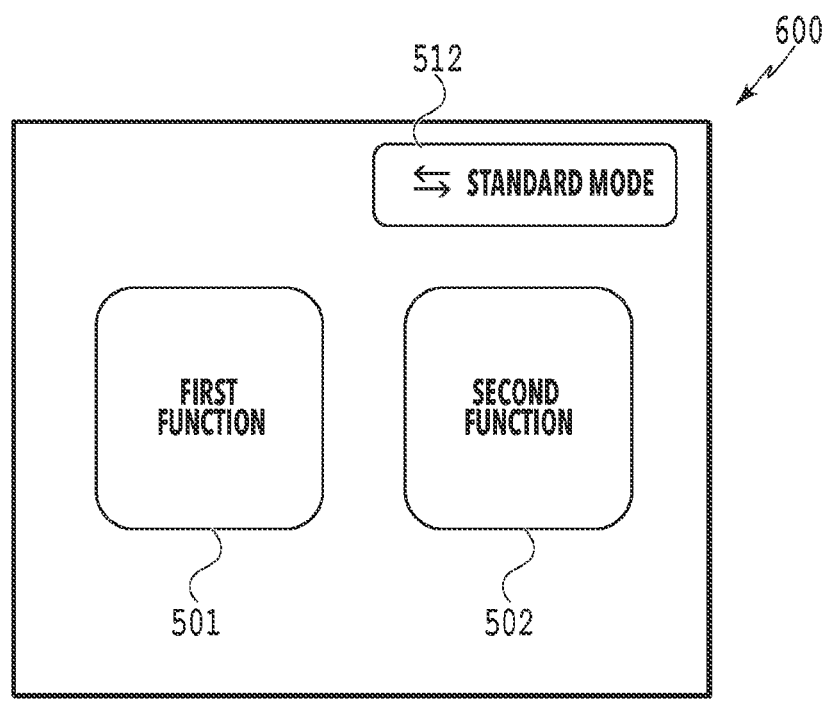
FIG. 7 is a view illustrating an example of a home screen for a simple mode.

In the case where the GUI mode switching button 512 is pressed, the flag of GUI mode (mode information) saved in the non-volatile memory 118 is updated from a flag indicating the standard mode to a flag indicating the simple mode and the screen is switched to a home screen 600 for the simple mode illustrated in FIG. 7. Note that, although two types of GUI modes of the standard mode in which the home screen 500 illustrated in FIGS. 5A and 5B is displayed and the simple mode in which the home screen 600 illustrated in FIG. 7 is displayed are illustrated as examples in the present embodiment, the types of GUI modes are not limited to these. GUI modes other than the standard mode and the simple mode may be included as GUI modes to which the MFP 100 can be switched by using the GUI mode switching button 512.

The information button 511 is a button for displaying the notification image based on the notification information received by the MFP 100. A display form of an icon illustrating the information button 511 changes depending on whether the MFP 100 has received new notification information or not. FIG. 5A illustrates the display form of the icon illustrating the information button 511 in the case where the MFP 100 has received no new notification information. Moreover, FIG. 5B illustrates the display form of the icon illustrating the information button 511 in the case where the MFP 100 has received new notification information. The setting button 515 is a button for performing various setting of the MFP 100.

In the state where the home screen 500 of the standard mode illustrated in FIG. 5B is displayed, the flag of GUI mode saved in the non-volatile memory 118 indicates the standard mode. Moreover, in the state illustrated in FIG. 5B, the flag (hereinafter referred to as flag of notification function) indicating whether the information notification function for notification of the notification information sent from the service management server 200 is enabled or disabled is set to enabled. In the case where the information button 511 is pressed in this state, the screen displayed on the LCD 109 of the MFP 100 is switched to the screen illustrated in FIG. 6 that is a notification screen based on new notification information. Thereafter, in the case where the user performs input indicating checking of the notification screen, the notification screen is switched to a screen indicating main body information (remaining ink amount, usage records, system information, and the like). In the case where the information button 511 is pressed in the state where the screen illustrated in FIG. 5A is displayed, the display screen of the LCD 109 is switched to the screen illustrating the main body information without switching to the notification screen.

The notification screen may be displayed based on conditions other than the pressing of the information button 511. Specifically, for example, the notification screen may be displayed based on power-on of the MFP 100 or completion of printing or scanning by the MFP 100.

FIG. 6 is a diagram schematically illustrating an example of a notification screen 700 displayed on the LCD 109 of the MFP 100 in the case where the flag of GUI mode saved in the non-volatile memory 118 indicates the standard mode and the flag of notification function is set to enabled. A notification image 701 obtained from the server and a close button 703 are present as the display elements. In the case where the close button 703 is pressed, the notification screen is set to non-display and the screen displayed just before the display of the notification screen is displayed. The present disclosure is not limited to this configuration and the screen may always return to the home screen 500 of the standard mode.

FIG. 7 is a diagram schematically illustrating the home screen 600 for the simple mode. The home screen 600 for the simple mode is displayed on the LCD 109 of the MFP 100. In the present embodiment, the first function 501 and the second function 502 that are the basic functions of the MFP 100 and the GUI mode switching button 512 are displayed as display elements in the home screen 600 for the simple mode. In the case where the GUI mode switching button 512 is pressed, the flag of GUI mode saved in the non-volatile memory 118 is updated to the flag indicating the standard mode and the screen displayed on the LCD 109 is switched to the screen illustrated in FIG. 5A. Note that the first function 501 and the second function 502 displayed as the buttons for executing the functions are merely examples and the number and contents of the buttons for executing the functions are not limited to particular number and contents. Moreover, other buttons for executing the functions that can be executed in the MFP 100 may be newly displayed by, for example, scrolling of the home screen 600. Furthermore, in the embodiment, the information button for displaying the notification screen is not displayed in the home screen 600 for the simple mode, unlike in the home screen 500 for the standard mode.

In the present embodiment, the functions for which the execution instructions can be given in the standard mode but cannot be given in the simple mode (hereinafter, standard functions) include, for example, a network setting function of the MFP 100. The functions for which the execution instructions can be given in the standard mode but cannot be given in the simple mode are, in other words, functions for which the buttons are displayed in the home screen 500 but are not displayed in the home screen 600. The network setting function is specifically, for example, a function of coupling the MFP 100 with an external access point. The standard functions also include, for example, a cloud print function, a scan function, a standard form print function, and an image data transfer function. The scan function is a function of obtaining and saving image data by scanning an original set in the MFP 100. The cloud print function is specifically, for example, a function of executing a Web application start-up process and obtaining an image on a Web application to print the obtained image. The standard form print function is specifically, for example, a function of printing standard forms saved in advance in the MFP 100 such as a graph paper, a writing paper, a manuscript paper, and a music paper. The image data transfer function is a function of transferring image data obtained in scanning by the MFP 100 and image data in a memory (SD card or the like) attached to the MFP 100 to a terminal device outside the MFP 100. Meanwhile, in the present embodiment, the functions for which the execution instructions can be given in both of the standard mode and the simple mode (that is, basic functions that can be used by simple operation) are, for example, a copy function, a memory print function, and a maintenance function. The copy function is specifically, for example, a function of printing image data obtained in scanning by the MFP 100. The memory print function is specifically, for example a function of printing image data in a memory (SD card or the like) attached to the MFP 100. The maintenance function is specifically, for example, a function of executing maintenance of an ink cartridge and a print head.

The functions for which the execution instructions can be given by user operations on the home screen in each mode are as described above. Meanwhile, for example, a print function for which an execution instruction is given by sending a print job from a terminal device coupled to the MFP 100 to the MFP 100 can be executed in all modes.

<Sequence>

Figure 8:
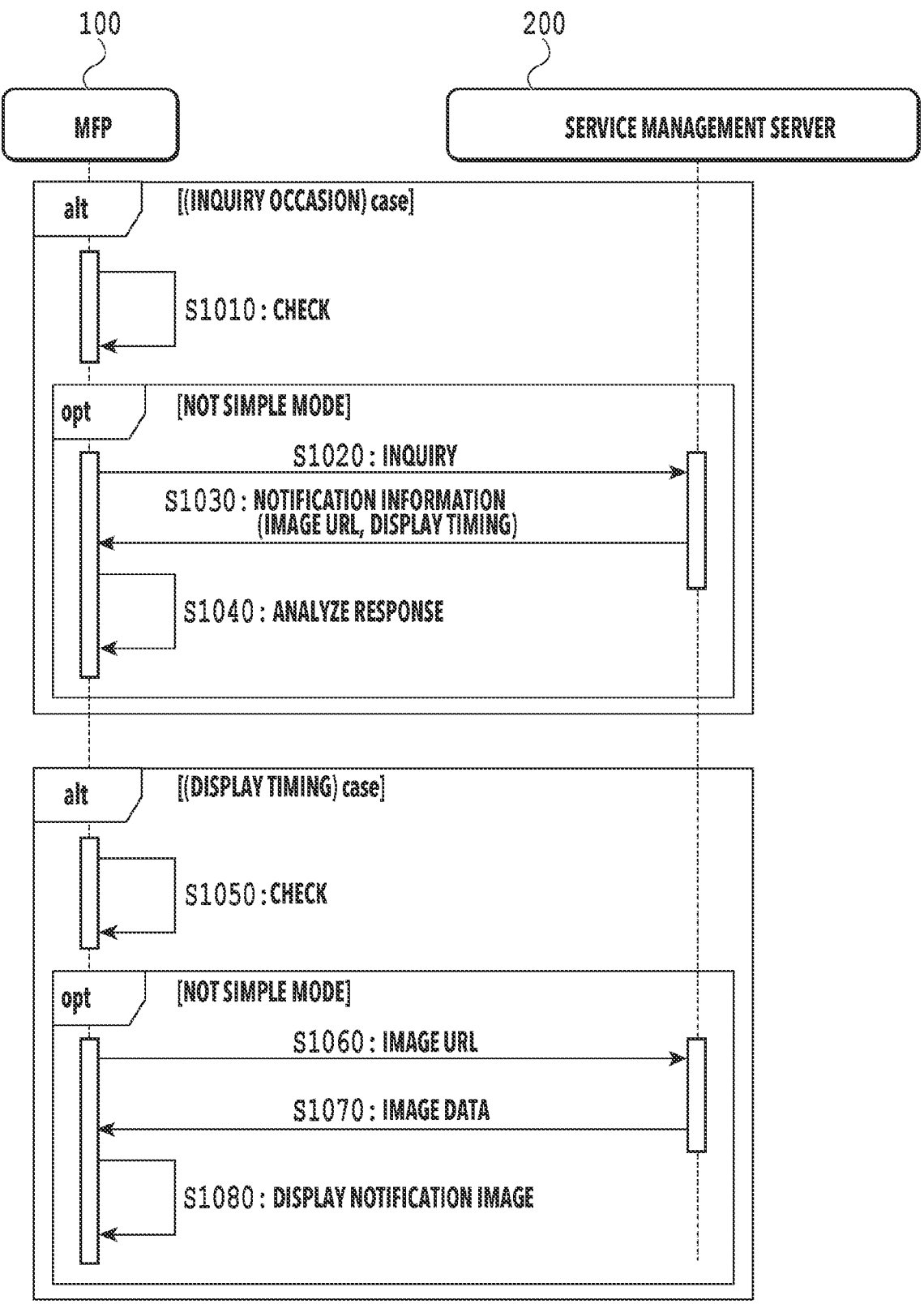
FIG. 8 is a sequence diagram illustrating an obtaining process and a display process of the notification information that are performed in the information processing system.

FIG. 8 is a sequence diagram illustrating the obtaining process and the display process of the notification information that are performed in the information processing system in the present embodiment. Note that S attached to the step numbers of the respective processes illustrated in FIG. 8 and FIGS. 11 to 15 to be referred to in the following explanation means step.

The MFP 100 inquires of the service management server 200 about whether new notification information is provided from the service providing server group 400 to the service management server 200, at a predetermined timing. The predetermined timing is, for example, start-up of the MFP 100 or a timing at which a predetermined time interval has elapsed from the last inquiry. In an occasion of an inquiry about the notification information, the MFP 100 performs a process of checking whether the flag of notification function saved in the non-volatile memory 118 is set to enabled or disabled (S1010). Note that the notification function is a function of displaying the notification screen and the user can set the notification function to enabled or disabled for the MFP 100. The enabled or disabled of the flag of notification function corresponds to enabled or disabled of the notification function. In the case where the flag of notification function is set to disabled in a result of the check process, the MFP 100 does not execute the process of inquiry about the notification information. Meanwhile, in the case where the notification function is enabled, the MFP 100 determines whether the flag of GUI mode saved in the non-volatile memory 118 is set to the simple mode or not. In the case where the MFP 100 determines that the flag is not set to the simple mode (in this example, in the case where the MFP 100 determines that the flag is set to the standard mode), in S1020, the MFP 100 performs the process of inquiring of the service management server 200 about the notification information. In the case where the MFP 100 determines that the flag is set to the simple mode, the MFP 100 does not perform the process of inquiring about the notification information. As a result, in the case where the MFP 100 determines that the flag is set to the simple mode, the MFP 100 does not execute the process of displaying the notification screen based on the notification information in the simple mode.

As described above, in S1020, the MFP 100 sends a request of the inquiry to the service management server 200. Next, in S1030, the service management server 200 sends a response including the contents of the notification information and timing information indicating a display timing of the notification screen, to the MFP 100. The MFP 100 having received the response analyzes the response in S1040 and updates the notification information saved in the non-volatile memory 118 from old notification information to new notification information.

Predetermined timings such as, for example, power-on of the MFP 100, completion of printing, pressing of the information button, and the like are set as the display timing. Note that the display timing is assumed to vary depending on the contents to be notified by the notification information.

Note that the contents to be notified by the notification information are, in other words, contents to be displayed on the notification screen corresponding to the notification information. In the embodiment, the contents notified by the notification information are, for example, advertisements (hereinafter, contents A) of printing materials (ink and toner) and print medium (paper sheet) used by the MFP 100 in the printing (image formation). Moreover, the contents notified in the notification information are, for example, contents (hereinafter, contents B) relating a Web application that can be used by the MFP 100. Note that the Web application that can be used by the MFP 100 are, for example, a Web application that can provide image contents and document contents to the MFP 100 and allow the MFP 100 to print the image contents and the document contents. Furthermore, the contents relating to the Web application that can be used by the MFP 100 are specifically, for example, contents notifying addition of a new Web application that can be used by the MFP 100 and contents prompting the user to use the Web application. Furthermore, the contents notified by the notification information may be contents (hereinafter, contents C) prompting the user to update the firmware of the MFP 100 or contents (hereinafter, contents D) relating a print service provided by the service providing server. The print service is, for example, a service in which the user of the MFP 100 can receive points usable by the user depending on the number of sheets printed by the MFP 100. Note that the user can use this service by, for example, executing a registration process of print service usage between the service providing server and a terminal device such as a smartphone owned by the user. Accordingly, for example, a screen relating to the print service is a screen prompting the user to use the print service or a screen prompting the user to execute the registration process of the print service usage.

In the case where the contents to be notified by the notification information is the contents A, the timings indicated by the timing information are power-on, print completion, and pressing of the information button to correspond to the contents. Meanwhile, in the case where the contents to be notified by the notification information are the contents B or the contents D, the timings indicated by the timing information are print completion and pressing of the information button to correspond to the contents. Moreover, in the case where the contents to be notified by the notification information are the contents C, the timings indicated by the timing information are power-on and pressing of the information button to correspond to the contents. Note that the present disclosure is not limited to this configuration and the timing corresponding to each content may be any timing. Moreover, for example, although three display timings (power-on, print completion, and pressing of the information button) are defined as the display timings in the present embodiment, the number and contents to be defined as the display timings are not limited to particular number and contents. Furthermore, the contents to be notified by the notification information may include contents other than those described above.

In the case where any of the display timings indicated in the timing information comes (any of power-on, print completion, and pressing of the information button occurs), in S1050, the MFP 100 performs the process of checking whether the flag of notification function saved in the non-volatile memory 118 is set to enabled or disabled. In the case where the flag of notification function is set to disabled in a result of the check process, the MFP 100 does not execute the process of displaying the notification screen. Meanwhile, in the case where the flag of notification function is set to enabled, the MFP 100 determines whether the flag of GUI mode saved in the non-volatile memory 118 is set to the simple mode or not. Then, in the case where the MFP 100 determines that the flag is not set to the simple mode, in S1060, the MFP 100 sends an image obtaining request to the service management server 200. In S1070, the service management server 200 having received the image obtaining request sends image data to the MFP 100. In S1080, the MFP 100 having obtained the image data displays the notification screen based on the notification information on the LCD 109 and notifies the contents of the notification information to the user. Meanwhile, in the case where the MFP 100 determines that the flag is set to the simple mode, the MFP 100 does not send the image obtaining request to perform control of not displaying the notification screen based on the notification information. Employing this configuration enables control of not displaying the notification screen based on the notification information received in the standard mode and saved as it is, in the simple mode.

<Response Example>

FIGS. 9A to 9C illustrate examples of the aforementioned response sent to the MFP 100 by the service management server 200 in S1030. The response of the present example is a text file described in a Java Script Objection Notation (JSON) format. The format of the response is described by using illustrated examples.

FIG. 9A illustrates a response for the notification information on important firmware update. A key "url" indicates a URL of an image file that is the contents of the notification information and takes a URL character string as a value. The request of S1060 is performed by specifying this URL.

A key "timing" indicates the display timing of the notification information and takes a value of one of "startup", "jobend", and "info". In the example illustrated in FIG. 9A, the key "timing" takes "startup" indicating the power-on as the value. Note that the value "jobend" indicates the display timing after print completion and the value "info" indicates the pressing of the information button 511.

FIG. 9B illustrates a response for the notification information on ink a purchase site. The keys include "timing" as in FIG. 9A and a value corresponding to the key "timing" is "jobend" indicating after print completion.

FIG. 9C illustrates a response for the notification information on download contents. The keys include "timing" as in FIG. 9A and a value corresponding to the key "timing" is "info" indicating the pressing of the information button 511.

In the aforementioned analysis process of S1040, the value corresponding to the key "timing" is determined to be the display timing of the notification. Specifically, the timing is determined to be the state at power-on in the case where the value is "startup", determined to be the state after the print completion in the case where the value is "jobend", and determined to be the state at pressing of the information button 511 in the case where the value is "info".

<Display Timing>

FIG. 10 is a table explaining the display timings of displaying the notification image based on the notification information saved in the non-volatile memory 118. In FIG. 10, the "power-on" refers to a state in idling in the case where a start-up operation process is completed. The "print completion" refers to a state in idling in the case where the print process is completed. The "pressing of the information button" refers to a state after pressing of the information button 511 displayed in the home screen 500 for the standard mode.

<Processing Procedure of MFP>

Figure 11:
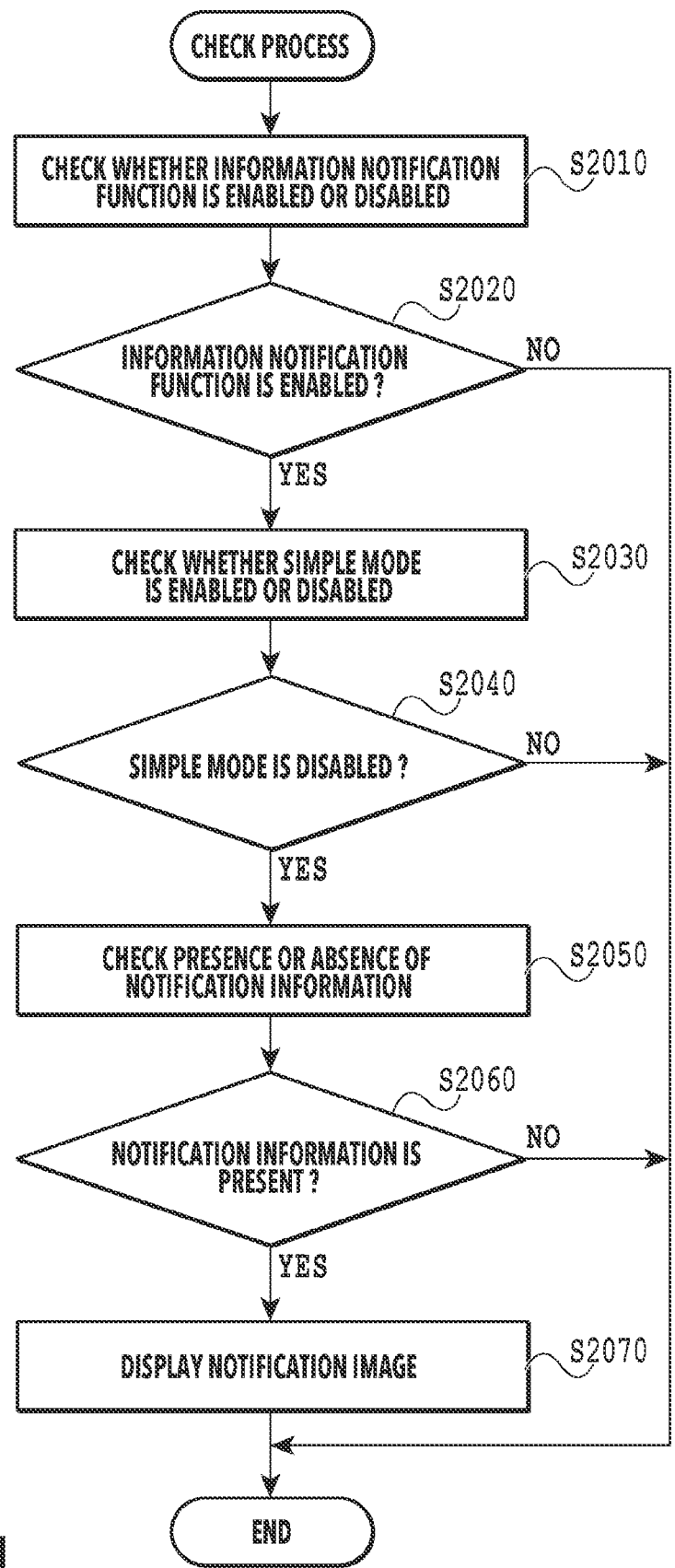
FIG. 11 is a flowchart illustrating a check process performed in the MFP after a response analysis process.

FIG. 11 is a flowchart illustrating a check process executed in the MFP 100 after completion of the aforementioned response analysis process in S1040. First, in S2010, the MFP 100 checks whether the information notification function is enabled or disabled based on the flag of notification function saved in the non-volatile memory 118. In the case where the MFP 100 confirms that the information notification function is enabled, in S2020, the processing proceeds to S2030. Meanwhile, in the case where the MFP 100 confirms that the information notification function is disabled, the processing is terminated.

Next, in S2030, the MFP 100 checks whether the GUI mode currently set in the MFP 100 is the simple mode or not based on the flag of GUI mode saved in the non-volatile memory 118. In the case where the MFP 100 confirms that the simple mode is not set, in S2040, the processing proceeds to S2050. Meanwhile, in the case where the MFP 100 confirms that the simple mode is set, the processing is terminated. Note that, in the present embodiment, the GUI modes that can be set in the MFP 100 include two types of modes of the simple mode and the standard mode. Accordingly, in the case where the MFP 100 determines that the simple mode is not set, the standard mode is set.

Next, in S2050, the MFP 100 checks whether the notification information to be notified on the LCD 109 of the MFP 100 is present in the non-volatile memory 118. Specifically, the MFP 100 checks whether data of the image URL and the display timing sent from the service management server 200 is present in the non-volatile memory 118. In the case where the MFP 100 confirms the presence of the notification information, in S2060, the processing proceeds to S2070. Meanwhile, in the case where the MFP 100 does not confirm the presence of the notification information, the processing is terminated. In step S2070, the notification screen based on the notification information is displayed on the LCD 109 of the MFP 100 depending on the display timing saved in the non-volatile memory 118.

Figure 12:
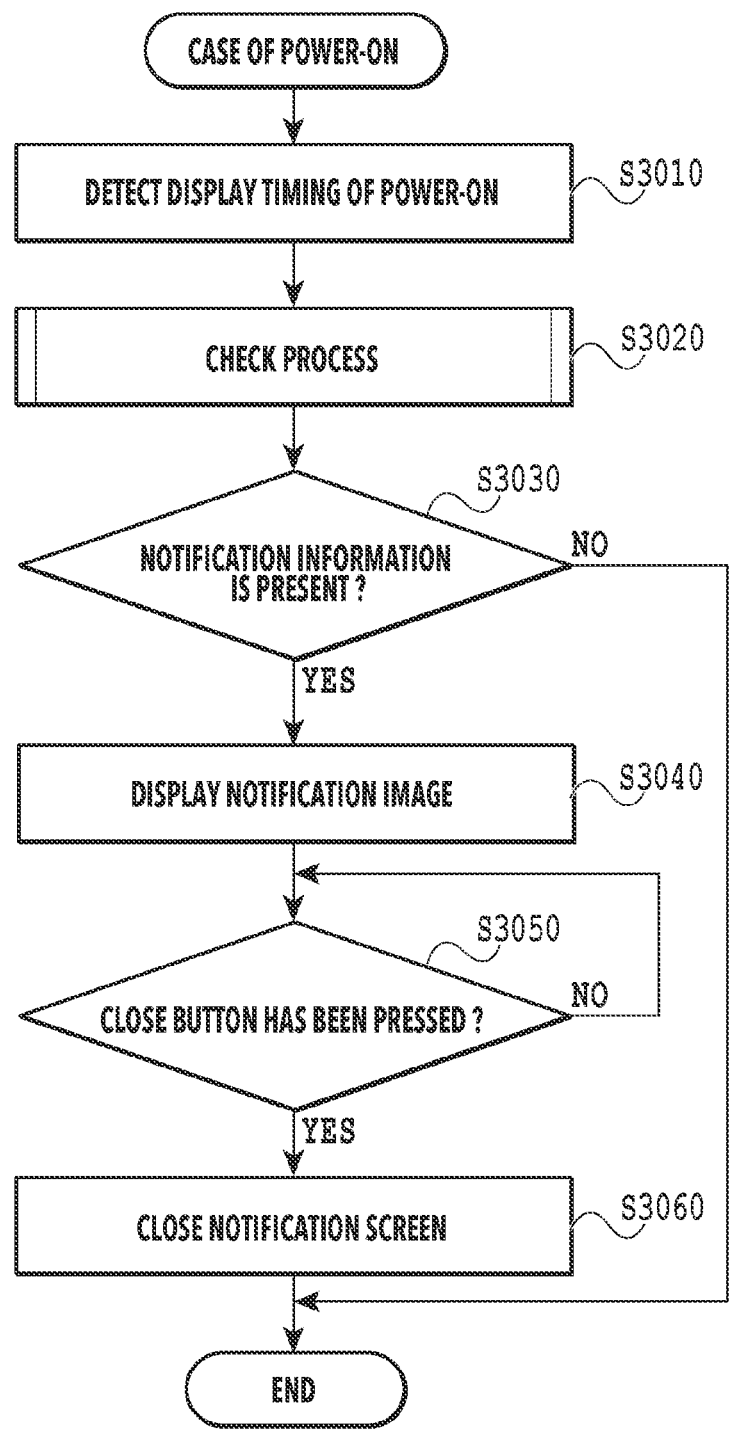
Figure 13:
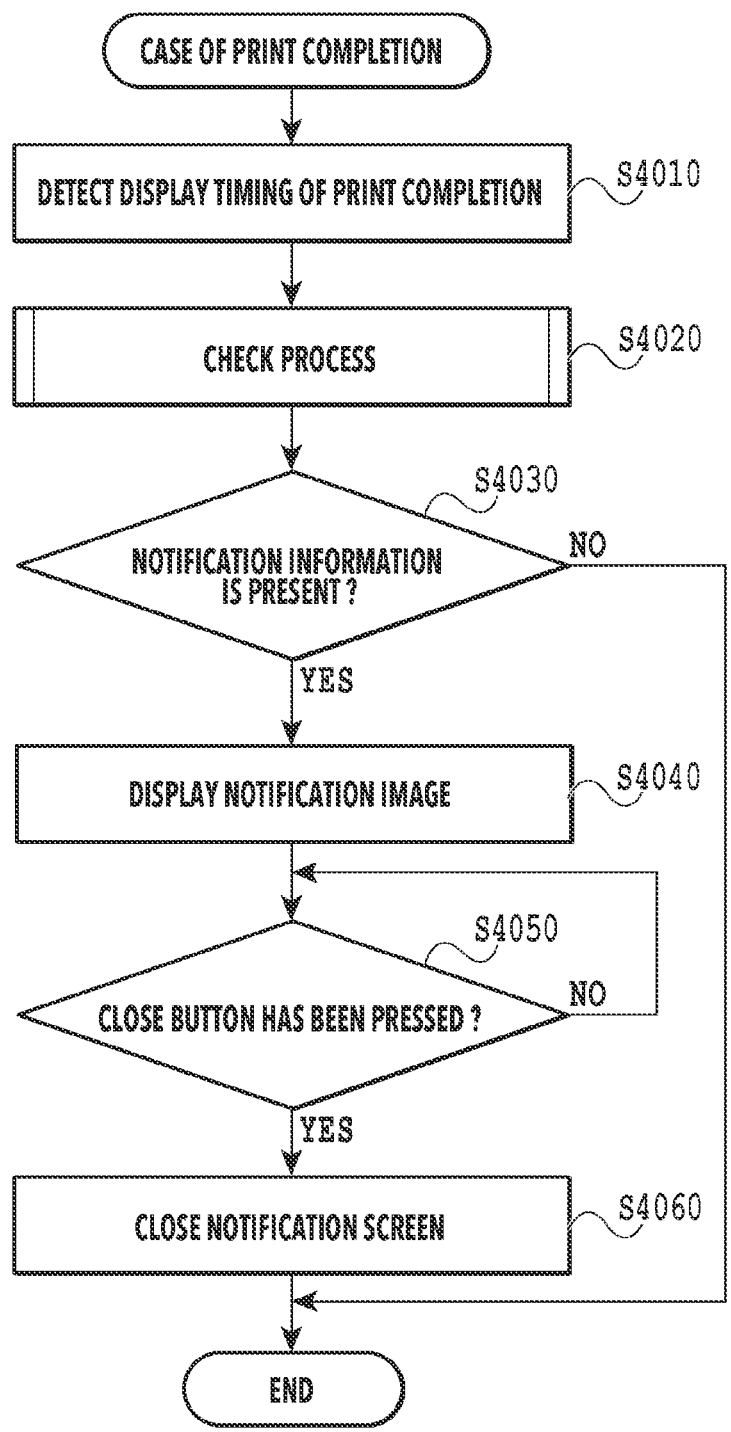
FIG. 13 is a flowchart illustrating a process of displaying the notification image after completion of a print process.
Figure 14:
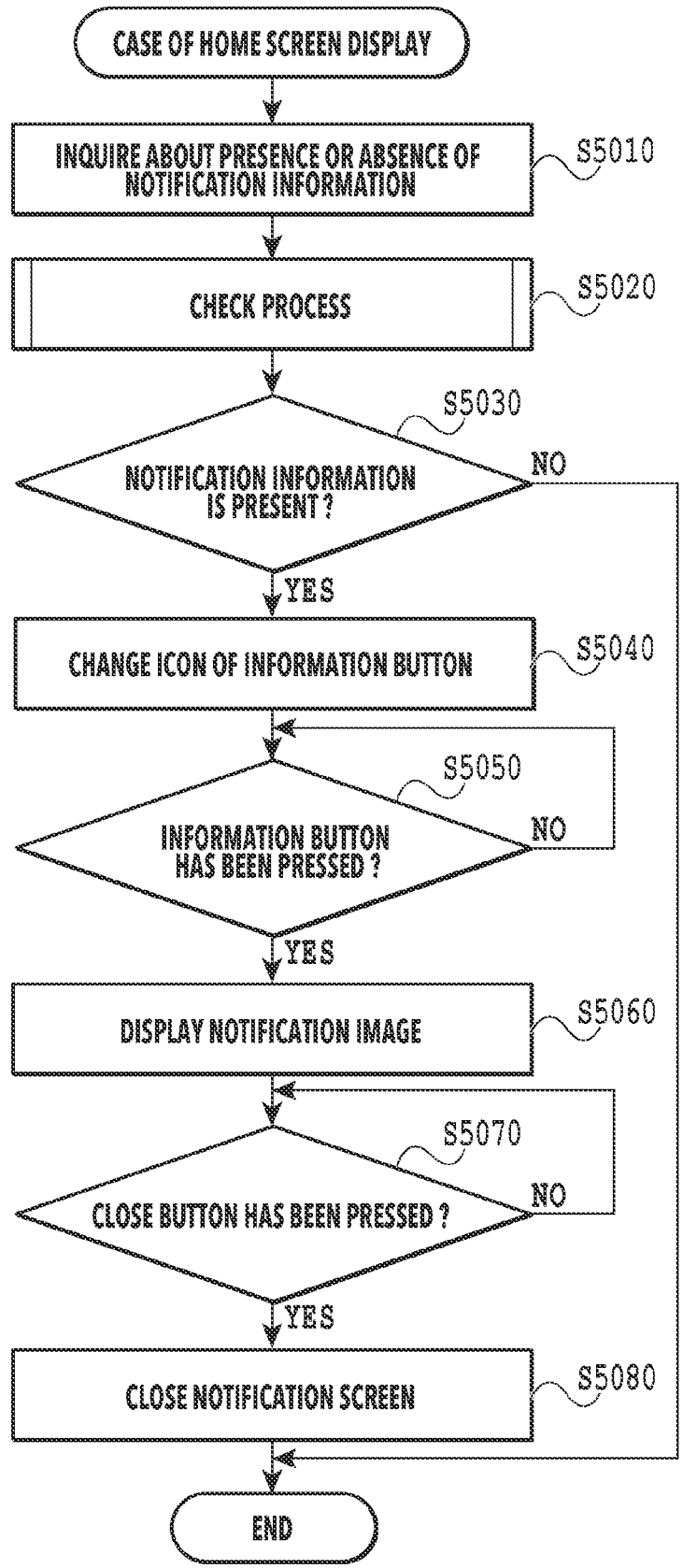
FIG. 14 is a flowchart illustrating a process executed in display of the home screen.

FIGS. 12 to 14 are flowcharts illustrating processes executed by the CPU 101 of the MFP 100 in the case where the notification screen based on the notification information is displayed in the aforementioned process of S1080. Note that each of the processes illustrated in FIGS. 12 to 14 are executed according to the display timing determined in the aforementioned response analysis process of S1040. Specifically, each of the display processes illustrated in FIGS. 12 to 14 are executed in the power-on in the case where the value corresponding to the key "timing" of the response is "startup", executed after print completion in the case where the key is "jobend", and is executed in the pressing of the information button 511 in the case where the key is "info".

FIG. 12 is a flowchart illustrating a process of displaying the notification image based on the notification information in the power-on of the MFP 100 in the case where the timing of display is determined to be "startup" in the aforementioned analysis process of S1040. In the case where the power-on of the MFP 100 is detected in S3010, in S3020, the CPU 101 executes the aforementioned check process illustrated in FIG. 11. In the case where the presence of the notification information is confirmed as a result of the check process, in S3030, the processing proceeds to S3040. Meanwhile, in the case where the presence of the notification information is not confirmed, the processing is terminated.

In S3040, the CPU 101 displays the notification screen 700 based on the notification information as illustrated in FIG. 6, on the LCD 109 of the MFP 100. The close button 703 for closing the screen is present in the notification screen 700. In S4050, the CPU 101 determines whether the user has pressed the close button 703 or not. In the case where the close button 703 has been pressed, in S4060, the CPU 101 closes the notification screen 700 of the notification information and displays the home screen or the screen displayed before the display of the notification screen, on the LCD 109.

FIG. 13 is a flowchart illustrating a process of displaying the notification image based on the notification information after the completion of the print process in the case where the timing of display is determined to be "jobend" in the aforementioned analysis process of S1040. In the case where the CPU 101 detects that the state of MFP 100 is print completion in S4010, in S4020, the CPU 101 executes the check process of FIG. 11. In the case where the presence of the notification information to be notified is confirmed as a result of the check process, in S4030, the processing proceeds to S4040.

In S4040, the CPU 101 displays the notification screen 700 based on the notification information, on the LCD 109 of the MFP 100. In S4050, the CPU 101 determines whether the close button 703 has been pressed by the user or not. In the case where the close button 703 has been pressed, in S4060, the CPU 101 closes the notification screen 700 based on the notification information and displays the home screen or the screen displayed before the display of the notification screen, on the LCD 109.

FIG. 14 is a flowchart illustrating a process performed in home screen display executed in the case where the timing of display is determined to be "info" in the analysis process of S1040. In this flowchart, a process of changing a display form of the icon of the information button 511 in the home screen and a process of displaying the notification image based on the notification information in the pressing of the information button 511 are executed according to the following procedures.

In S5010, the CPU 101 inquires about presence or absence of the notification information. Thereafter, in S5020, the CPU 101 executes the check process of FIG. 11. In the case where the presence of the notification information is confirmed in S5030 as a result of the check process, in S5040, the CPU 101 changes the display form of the icon of the information button 511 to, for example, that illustrated in FIG. 5B. In S5050, the CPU 101 determines whether the user has pressed the information button 511. In the case where the information button 511 has been pressed, in S5060, the CPU 101 displays the notification screen based on the notification information, on the LCD 109 of the MFP 100. In S5070, the CPU 101 determines whether the user has pressed the close button 703. In the case where the close button 703 has been pressed, in S5080, the CPU 101 closes the notification screen 700 based on the notification information and displays the home screen or the screen displayed before the display of the notification screen, on the LCD 109.

As described above, in the embodiment, display and non-display of the notification information can be switched depending the usage status of the GUI mode in the information processing apparatus. Specifically, in the case where the user uses the standard mode, the notification image based on the notification information that is provided by the service providing server group 400 via the service management server 200 can be displayed. Meanwhile, in the case where the user uses the simple mode, the notification image is not displayed and only the functions to be used are displayed. Accordingly, the user using the simple mode is freed from hassle caused displaying of unnecessary information and the usability of the information processing apparatus is improved.

Note that, in the aforementioned embodiment, the MFP 100 determines whether to display the notification image based on the notification information, at the display timing in the response of S1030. However, the MFP 100 may perform a process similar to the check process of S1050 in the case where the GUI mode is changed from the simple mode in which the notification image based on the notification information is not displayed to the standard mode in which the notification image relating to the notification information is displayed. In this case, since the MFP 100 can perform the check of S1050 without waiting until the timing specified in the response of S1030 comes, the MFP 100 can display the notification image of the notification information at a more proper timing. Moreover, although the example in which the MFP 100 accesses the image URL obtained in S1030 and obtains the image data in S1070 is described in the aforementioned embodiment, the image information obtained in S1030 may be a path of an image folder.

Second Embodiment

In the aforementioned first embodiment, there is described an example in which the process of inquiry about the notification information from the MFP 100 to the service management server 200 is performed in the case where the flag of GUI mode information is not set to the simple mode in the occasion of inquiry about the notification information. Meanwhile, in an information processing system in a second embodiment of the present disclosure, the MFP 100 performs the obtaining process and the display process of the notification information in the case where the occasion of inquiry about the notification information comes, irrespective of the GUI mode. Processes executed in the second embodiment of the present disclosure are described below with reference to FIG. 14.

<Sequence>

Figure 15:
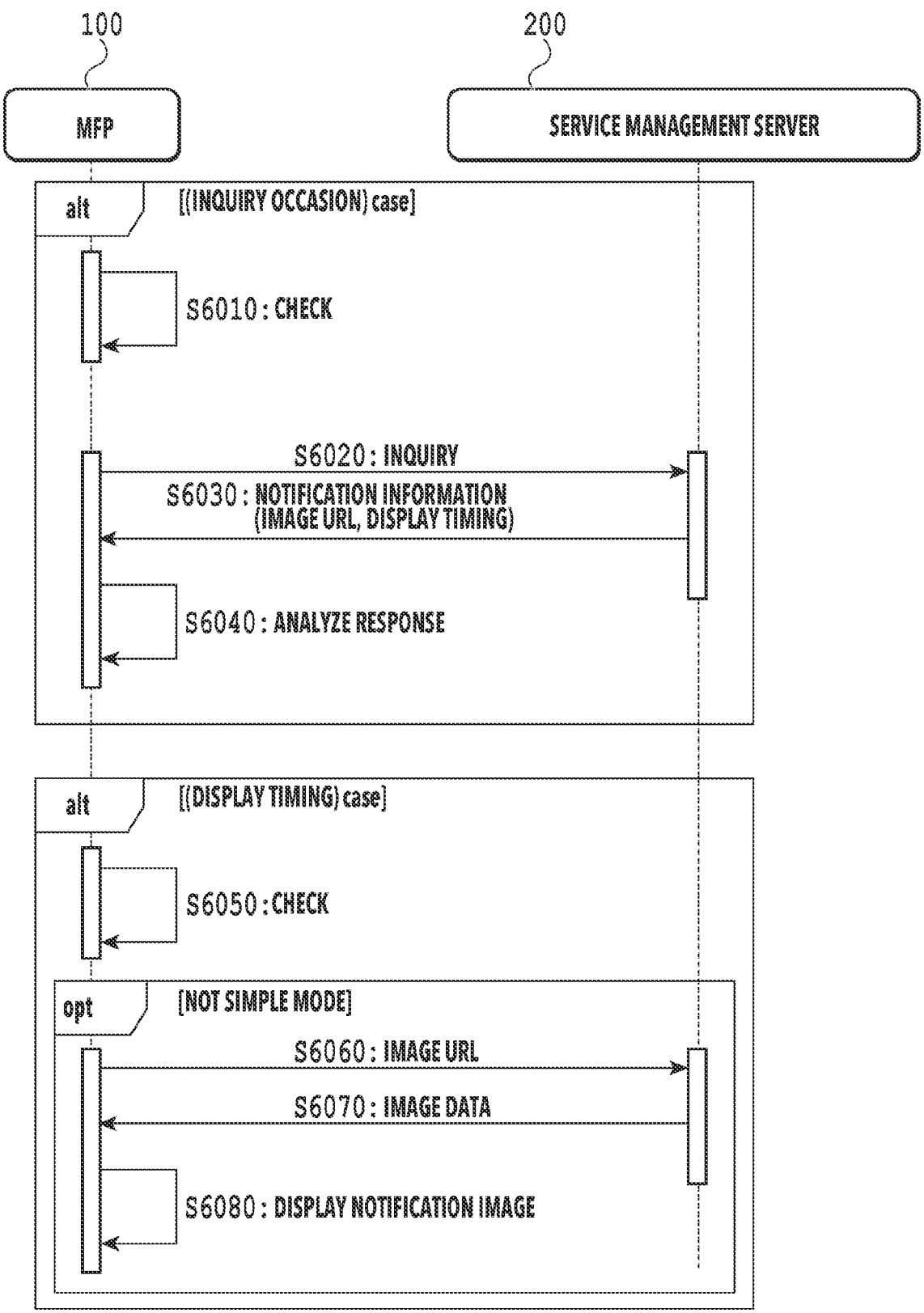
FIG. 15 is a sequence diagram illustrating an obtaining process of the notification information and a display process of the notification image.

FIG. 15 is a sequence diagram illustrating the obtaining process and the display process of the notification information executed in the present embodiment. Note that in the present embodiment, a system and apparatuses are assumed to have the same configurations as those illustrated in FIGS. 1 to 4.

In the case where the occasion of inquiry about the notification information comes, in S6010, the MFP 100 checks whether the flag of notification function saved in the non-volatile memory 118 is set to enabled or disabled. In the case where the flag is set to disabled, the MFP 100 executes no process. In the case where the notification function is set to enabled, the MFP 100 performs the process of inquiring of the service management server 200 about the notification information. The occasion of inquiry about the notification information comes at a predetermined timing. For example, the inquiry may be periodically performed every time a fixed period elapses or be performed at start-up of the MFP 100.

In S6020, the MFP 100 sends the request of inquiry to the service management server 200. In response to this request, the service management server 200 sends the response including the contents of the notification information and the display timing to the MFP 100 (S6030). In S6040, the MFP 100 having received the response analyzes the response irrespective of whether the GUI mode is the simple mode or the standard mode. Thereafter, the MFP 100 saves and updates the image URL and the display timing saved in the non-volatile memory 118 based on the analysis result. The notification image based on the notification information can be thereby instantly displayed at the timing where the GUI mode is switched.

Other Embodiments

Although the examples in which none of the pieces of notification information sent from the service providing server group 400 to the service management server 200 are notified in the simple mode are described in the aforementioned embodiments, the present disclosure is not limited to this. Specifically, in the case where the pieces of notification information sent from the service management server 200 includes the notification information corresponding to a function used in the simple mode, only the corresponding notification information may be displayed also in the simple mode. For example, the information button 511 illustrated in FIGS. 5A and 5B is displayed also in the simple mode and, in the case where the notification information corresponding to the function in the simple mode is present, the display form of the information button 511 is changed to notify the presence of the notification information to the user. Then, in the case where the user presses the information button 511, only the information corresponding to the simple mode is displayed. This allows notification of necessary information to the user also in the simple mode and the usability as the information processing apparatus is further improved.

Although the simple mode is described above as a mode in which the notification screen is not displayed, the present disclosure is not limited to this configuration and may include other modes. Specifically, for example, the simple mode may be a home mode. The home mode is specifically, for example, a mode in which display is limited such that execution instructions can be given only for the functions that are frequently used in work at home among the functions for which the execution instructions can be given in the standard mode. In other words, the number of functions for which the execution instructions can be given in the home screen displayed in the home mode is smaller than the number of functions for which the execution instructions can be given in the home screen displayed in the standard mode. The functions for which the execution instructions can be given in the standard mode but cannot be given in the home mode are, for example, the network setting function of the MFP 100, the memory print function, the maintenance function, and the scan function. Moreover, the functions for which the execution instructions can be given in both of the standard mode and the home mode (that is, the functions that are frequently used in work at home) are, for example, the cloud print function, the copy function, the standard form print function, and the image data transfer function. Note that the MFP 100 may be operable in three modes of the standard mode, the simple mode, and the home mode.

Moreover, although the MFP 100 is given as an example of the information processing apparatus in the aforementioned embodiments, the present disclosure can be applied also to information processing apparatuses other than the MFP. For example, the present disclosure can be applied to a copying machine, a printer, a portable information terminal, a personal computer, a scanner apparatus, a facsimile apparatus, and the like. In any of the information processing apparatuses, the notification or non-notification of the notification information provided by the server system can be controlled depending on the used GUI mode, as in the aforementioned embodiments. This can improve the usability of the information processing apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-137501 filed Aug. 25, 2021, which is hereby incorporated by reference wherein in its entirety.

What is claimed is:

1. An information processing apparatus having a home screen for a first mode that displays buttons for instructing execution of functions and a home screen for a second mode that contains fewer buttons for instructing the execution of the functions than the buttons for instructing the execution of the functions that are displayed in the first mode, comprising:

a display;
at least one processor; and
at least one memory storing instructions that, upon execution by the at least one processor, cause the at least one processor to function as a display control unit capable of selectively displaying on the display the home screen for the first mode and the home screen for the second mode, and configured to control displaying on the display a notification image regarding the functions of the information processing apparatus; and an obtainment unit configured to obtain notification information which is provided by a server system through communication with the server system, and which includes image information corresponding to the notification image and information indicating a display timing for displaying the notification image, wherein the instructions, upon execution, cause the at least one processor to determine the mode of the information processing apparatus at a predetermined timing and cause the obtainment unit to obtain the notification information in accordance with the determined mode of the information processing apparatus, wherein the obtainment unit obtains the notification information if the determined mode is a mode in which the home screen for the first mode is displayed by the display control unit, and does not obtain the notification information if the determined mode is a mode in which the home screen for the second mode is displayed by the display control unit, and determine whether the information processing apparatus meets the display timing included in the notification information obtained in a case where the mode of the information processing apparatus is the mode in which the home screen for the first mode is displayed by the display control unit, wherein in a case where it is determined that the information processing apparatus does not meet the display timing, the display control unit does not perform the display process of the notification image, and in a case where it is determined that the information processing apparatus meets the display timing, the at least one processor determines the current mode of the information processing apparatus and causes the display control unit to perform the display process of the notification image in accordance with the current mode, wherein in a case where the current mode of the information processing apparatus is the mode in which the home screen for the first mode is displayed by the display control unit, the display control unit performs a display process of the notification image, and in a case where the current mode of the information processing apparatus is the mode in which the home screen for the second mode is displayed by the display control unit, the display control unit does not perform the display process of the notification image.

2. The information processing apparatus according to claim 1, wherein the stored instructions further cause the at least one processor to function as:

an obtaining unit that obtains mode information indicating a mode set by a user.

3. The information processing apparatus according to claim 2, wherein the display process includes:

a process of sending an image obtaining request including the image information to the server system in a case where the mode indicated by the mode information obtained by the obtaining unit is a predetermined mode;

a process of obtaining the notification image sent from the server system in response to the image obtaining request; and a process of causing the display to display the notification image.

4. The information processing apparatus according to claim 3, wherein the predetermined mode is a mode in which all functions executable in the information processing apparatus are displayed as display elements.

5. The information processing apparatus according to claim 2, wherein the stored instructions further cause the at least one processor to function as:

a save unit that saves the notification information obtained by the obtainment unit, wherein the first mode is a standard mode in which the display is caused to display all of a plurality of executable functions and the second mode is a basic mode in which the display is caused to display part of the plurality of executable functions, and the display control unit allows the display to display the notification image based on all pieces of the notification information savable in the save unit in a case where the mode indicated by the mode information obtained by the obtaining unit is the standard mode, and does not allow the display to display the notification image based on the notification information not corresponding to the basic mode among the pieces of notification information savable in the save unit in a case where the mode indicated by the mode information obtained by the obtaining unit is the basic mode.

6. The information processing apparatus according to claim 2, wherein the display control unit causes the display not to display the notification image based on the notification information in a case where the mode indicated by the mode information obtained by the obtaining unit is the second mode.

7. The information processing apparatus according to claim 5, wherein the display control unit performs the display process of the notification image depending on a timing at which the mode indicated by the mode information obtained by the obtaining unit is switched from the basic mode to the standard mode.

8. The information processing apparatus according to claim 5, wherein the display control unit causes the display to display at least the executable functions, an information button used to instruct display of the notification information, and a display mode switching button used to switch the display mode in the standard mode, and to display at least the executable functions and the display mode switching button used to switch the display mode in the basic mode.

9. The information processing apparatus according to claim 8, wherein the display control unit changes a display form of the information button in a case where the notification information is present.

10. The information processing apparatus according to claim 1, wherein the stored instructions further cause the at least one processor to function as:

an obtaining unit that obtains mode information indicating a mode set by a user, the obtainment unit performs a process to obtain the notification information that includes:

a process of sending a request of inquiry about presence or absence of the notification information to the server system; and a process of obtaining the notification information included in a response to the request sent from the server system.

11. The information processing apparatus according to claim 1, wherein the image information is a path of an image folder or a URL used to access the server system holding the notification image.

12. The information processing apparatus according to claim 1, wherein the information processing apparatus is an MFP, a copying machine, a printer, a portable information terminal, a personal computer, a scanner apparatus, or a facsimile apparatus.

13. The information processing apparatus according to claim 1, wherein the stored instructions further cause the at least one processor to function as:

a setting unit capable of setting either a mode in which the home screen for the first mode can be displayed or a mode in which the home screen for the second mode can be displayed;
and an obtaining unit that obtains mode information indicating a mode set by a user, wherein the display control unit displays either the home screen for the first mode or the home screen for the second mode depending on the mode information obtained by the obtaining unit.

14. The information processing apparatus according to claim 1, wherein the stored instructions further cause the at least one processor to function as:

a save unit that saves the notification information obtained by the obtainment unit, wherein, the display control unit allows the display to display a notification image based on the notification information in a case where the notification information saved in the save unit corresponds to the mode of the information processing apparatus, and causes the display not to display the notification image in a case where the notification information does not correspond to the mode of the information processing apparatus.

15. The information processing apparatus according to claim 1, wherein notification information that is not notified on the home screen for the second mode is notification information about a function that is not executable on the home screen for the second mode.

16. The information processing apparatus according to claim 1, wherein notification information that is not notified to the home screen for the second mode is notification information about a function that is executable in a mode in which the home screen for the first mode can be displayed but is not executable in a mode in which the home screen for the second mode can be displayed.

17. The information processing apparatus according to claim 1, wherein notification information that is not notified to the home screen for the second mode is notification information about a button for instructing execution of a function that is not displayed on the home screen for the second mode.

18. The information processing apparatus according to claim 1, wherein the display control unit performs the display process of the notification image based on being switched from the mode in which the home screen for the second mode is displayed to the mode in which the home screen for the first mode is displayed by the display control unit, even if the information processing apparatus does not meet the display timing.

19. The information processing apparatus according to claim 1, wherein the display control unit performs the display process of the notification image in a case where the notification information includes information corresponding to a function used in the second mode, even if the mode of the information processing apparatus is the mode in which the home screen for the second mode is displayed by the display control unit.

20. The information processing apparatus according to claim 19, wherein the display process of the notification image is a display process of the information corresponding to the function used in the second mode.

21. The information processing apparatus according to claim 1, wherein the obtainment unit obtains notification information based on the mode of the information processing apparatus being the mode in which the home screen for the first mode is displayed by the display control unit and the information processing apparatus meets a predetermined timing.

22. The information processing apparatus according to claim 21, wherein the predetermined timing is startup of the information processing apparatus.

23. The information processing apparatus according to claim 21, wherein the predetermined timing is a timing at which a predetermined time interval has elapsed from last obtainment of the notification information.

24. The information processing apparatus according to claim 1, wherein the display control unit performs the display process of the notification image in a case where the mode of the information processing apparatus is the mode in which the home screen for the first mode is displayed by the display control unit, the information processing apparatus meets the display timing, and a function to notify the notification image is enabled.

25. The information processing apparatus according to claim 1, wherein the display timing is different based on a content of the notification image.

26. The information processing apparatus according to claim 25, wherein the content of the notification image includes at least one of an advertisement of printing materials and a print medium used by the information processing apparatus, a content relating to a Web application that can be used by the information processing apparatus, a content relating to prompting the user to update the firmware of the information processing apparatus, and a content relating to a print service provided by the server system.

27. The information processing apparatus according to claim 25, wherein, in a case where the content of the notification image is an advertisement of printing materials and a print medium used by the information processing apparatus, the display timing is one of the cases when a power of the information processing apparatus is turned on, the information processing apparatus has completed the printing process, and a button to display the notification image is operated.

28. The information processing apparatus according to claim 25, wherein, in a case where the content of the notification image is the contents relating to a Web application that can be used by the information processing apparatus or the contents relating a print service provided by the server system, the display timing is the case when the information processing apparatus has completed the printing process or the button to display the notification image is operated.

29. The information processing apparatus according to claim 25, wherein, in a case where the content of the notification image is a content relating to prompting the user to update the firmware of the information processing apparatus, the display timing is a case when a power of the information processing apparatus is turned on or a button to display the notification image is operated.

30. The information processing apparatus according to claim 1, wherein the display timing is a case when a button to display the notification image is operated.

31. The information processing apparatus according to claim 30, wherein the button to display the notification image is displayed in the home screen for the first mode but is not displayed in the home screen for the second mode.

32. The information processing apparatus according to claim 1, wherein the functions executable in the first mode and not executable in the second mode are not displayed in the home screen for the second mode.

33. The information processing apparatus according to claim 32, wherein one of the functions executable in the first mode and not executable in the second mode is the network setting function.

34. An information processing system comprising:
an information processing apparatus having a home screen for a first mode that displays buttons for instructing execution of functions and a home screen for a second mode that contains fewer buttons for instructing the execution of the functions than the buttons for instructing the execution of the functions that are displayed in the first mode; and
a server system capable of communicating with the information processing apparatus, wherein
the information processing apparatus includes:
a display;
at least one processor; and
at least one memory storing instructions that, upon execution by the at least one processor, cause the at least one processor to function as
a display control unit capable of selectively displaying on the display the home screen for the first mode and the home screen for the second mode, and configured to control displaying on the display a notification image regarding the functions of the information processing apparatus; and
an obtainment unit configured to obtain notification information which is provided by a server system through communication with the server system, and which includes image information corresponding to the notification image and information indicating a display timing for displaying the notification image,
wherein the instructions, upon execution, cause the at least one processor to
determine the mode of the information processing apparatus at a predetermined timing and cause the obtainment unit to obtain the notification information in accordance with the determined mode of the information processing apparatus, wherein the obtainment unit obtains the notification information if the determined mode is a mode in which the home screen for the first mode is displayed by the display control unit, and does not obtain the notification information if the determined mode is a mode in which the home screen for the second mode is displayed by the display control unit, and
determine whether the information processing apparatus meets the display timing included in the notification information obtained in a case where the mode of the information processing apparatus is the mode in which the home screen for the first mode is displayed by the display control unit,
wherein
in a case where it is determined that the information processing apparatus does not meet the display timing, the display control unit does not perform the display process of the notification image, and
in a case where it is determined that the information processing apparatus meets the display timing,
the at least one processor determines the current mode of the information processing apparatus and causes the display control unit to perform the display process of the notification image in accordance with the current mode, wherein
in a case where the current mode of the information processing apparatus is the mode in which the home screen for the first mode is displayed by the display control unit, the display control unit performs a display process of the notification image, and
in a case where the mode of the information processing apparatus is the mode in which the home screen for the second mode is displayed by the display control unit, the display control unit does not perform the display process of the notification image.

35. The information processing system according to claim 34, wherein the server system is formed of one or a plurality of server apparatuses capable of communicating with the information processing apparatus.

36. The information processing system according to claim 34, wherein the server system includes a service providing server that is formed of at least one server apparatus configured to provide notification information and a service management server that receives the notification information provided by the service providing server and that sends the received notification information to the information processing apparatus.

37. An information processing method comprising:
a step of controlling a display of an information processing apparatus to allow the display to selectively display a home screen for a first mode that displays buttons for instructing execution of functions and a home screen for a second mode that contains fewer buttons for instructing the execution of the functions than the buttons for instructing the execution of the functions that are displayed in the first mode;
a step of controlling displaying on the display a notification image regarding the functions of the information processing apparatus; and
a step of obtaining notification information which is provided by a server system through communication with the server system, and which includes image information corresponding to the notification image and information indicating a display timing for displaying the notification image,
wherein
the obtaining comprises determining the mode of the information processing apparatus at a predetermined timing and obtaining the notification information in accordance with the determined mode of the information processing apparatus, wherein the notification information is obtained if the determined mode is a mode in which the home screen for the first mode is displayed, and the notification information is not obtained if the determined mode is a mode in which the home screen for the second mode is displayed, and the controlling displaying of the notification image comprises determining whether the information processing apparatus meets the display timing included in the notification information obtained in a case where the mode of the information processing apparatus is the mode in which the home screen for the first mode is displayed, wherein in a case where it is determined that the information processing apparatus does not meet the display timing, a display process of the notification image is not performed, and in a case where it is determined that the information processing apparatus meets the display timing, the current mode of the information processing apparatus is determined and the display process of the notification image is performed in accordance with the current mode, wherein in a case where the current mode of the information processing apparatus is the mode in which the home screen for the first mode is displayed, the step of controlling the display of the notification image performs the display process of the notification image, and in a case where the current mode of the information processing apparatus is the mode in which the home screen for the second mode is displayed, the step of controlling display of the notification image does not perform the display process of the notification image.

38. A non-transitory computer readable storage medium storing a program for causing a computer to execute a process, the process comprising:

a step of controlling a display of an information processing apparatus to allow the display to selectively display a home screen for a first mode that displays buttons for instructing execution of functions and a home screen for a second mode that contains fewer buttons for instructing the execution of the functions than the buttons for instructing the execution of the functions that are displayed in the first mode;

a step of controlling displaying on the display a notification image regarding the functions of the information processing apparatus; and a step of obtaining notification information which is provided by a server system through communication with the server system, and which includes image information corresponding to the notification image and information indicating a display timing for displaying the notification image, wherein the obtaining comprises determining the mode of the information processing apparatus at a predetermined timing and obtaining the notification information in accordance with the determined mode of the information processing apparatus, wherein the notification information is obtained if the determined mode is a mode in which the home screen for the first mode is displayed, and the notification information is not obtained if the determined mode is a mode in which the home screen for the second mode is displayed, and the controlling displaying of the notification image comprises determining whether the information processing apparatus meets the display timing included in the notification information obtained in a case where the mode of the information processing apparatus is the mode in which the home screen for the first mode is displayed, wherein in a case where it is determined that the information processing apparatus does not meet the display timing, a display process of the notification image is not performed, and in a case where it is determined that the information processing apparatus meets the display timing, the current mode of the information processing apparatus is determined and the display process of the notification image is performed in accordance with the current mode, wherein in a case where the current mode of the information processing apparatus is the mode in which the home screen for the first mode is displayed, the step of controlling the display of the notification image performs the display process of the notification image, and in a case where the current mode of the information processing apparatus is the mode in which the home screen for the second mode is displayed, the step of controlling display of the notification image does not perform the display process of the notification image.

* * * * *